US011895700B2

(12) United States Patent
Liu et al.

(10) Patent No.: US 11,895,700 B2
(45) Date of Patent: Feb. 6, 2024

(54) LISTEN BEFORE TALK BASED RESOURCE MODIFICATION AND REDUCED CHANNEL OCCUPANCY TIME SHARING SIGNALING FOR SIDELINK COMMUNICATION IN UNLICENSED SPECTRUM

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/103,012

(22) Filed: Nov. 24, 2020

(65) Prior Publication Data

US 2022/0167402 A1 May 26, 2022

(51) Int. Cl.
*H04W 28/04* (2009.01)
*H04W 74/08* (2009.01)

(52) U.S. Cl.
CPC ....... *H04W 74/0808* (2013.01); *H04W 28/04* (2013.01)

(58) Field of Classification Search
CPC ............ H04W 64/003; H04W 74/0816; H04L 5/005; H04K 3/20; H04J 3/00; G01S 7/0235; G01S 5/0236
See application file for complete search history.

(56) References Cited

U.S. PATENT DOCUMENTS

| | | | |
|---|---|---|---|
| 2016/0302226 A1* | 10/2016 | Kim | H04W 72/23 |
| 2019/0306923 A1* | 10/2019 | Xiong | H04J 13/0062 |
| 2019/0349979 A1* | 11/2019 | Park | H04W 24/10 |
| 2020/0037343 A1 | 1/2020 | He et al. | |
| 2020/0163128 A1* | 5/2020 | Pang | H04W 72/0453 |
| 2020/0275492 A1* | 8/2020 | Lei | H04L 5/0053 |

(Continued)

FOREIGN PATENT DOCUMENTS

| | | |
|---|---|---|
| EP | 3817428 A1 | 5/2021 |
| WO | 2020024854 A1 | 2/2020 |
| WO | 2020033381 A1 | 2/2020 |

OTHER PUBLICATIONS

International Search Report and Written Opinion—PCT/US2021/072508—ISA/EPO—dated Mar. 23, 2022.

*Primary Examiner* — Syed Ali
(74) *Attorney, Agent, or Firm* — Harrity & Harrity, LLP

(57) ABSTRACT

Various aspects of the present disclosure generally relate to wireless communication. In some aspects, a user equipment (UE) may select, within a resource selection window, a set of resources in which to transmit over an unlicensed sidelink channel. The UE may attempt a listen before talk (LBT) procedure to initiate a channel occupancy time in which to transmit over the unlicensed sidelink channel. The UE may adjust, within at least a portion of the resource selection window, the set of resources in which to transmit over the unlicensed sidelink channel to be contiguous in at least a time domain based at least in part on the LBT procedure succeeding. The UE may transmit, over the unlicensed sidelink channel, using the set of resources that are adjusted to be contiguous in at least the time domain. Numerous other aspects are provided.

30 Claims, 10 Drawing Sheets

(56) References Cited

U.S. PATENT DOCUMENTS

| | | | |
|---|---|---|---|
| 2021/0168849 A1* | 6/2021 | Oh | H04W 72/23 |
| 2021/0243749 A1 | 8/2021 | Hoang et al. | |
| 2021/0360673 A1* | 11/2021 | Myung | H04L 1/1864 |
| 2022/0015147 A1* | 1/2022 | Zhang | H04W 74/0816 |
| 2022/0070918 A1* | 3/2022 | Fan | H04W 74/006 |
| 2022/0070935 A1* | 3/2022 | Xue | H04W 80/02 |
| 2022/0287094 A1* | 9/2022 | Tooher | H04L 5/005 |

\* cited by examiner

LISTEN BEFORE TALK BASED RESOURCE MODIFICATION AND REDUCED CHANNEL OCCUPANCY TIME SHARING SIGNALING FOR SIDELINK COMMUNICATION IN UNLICENSED SPECTRUM

FIELD OF THE DISCLOSURE

Aspects of the present disclosure generally relate to wireless communication and to techniques and apparatuses for listen before talk (LBT) based resource modification and reduced channel occupancy time (COT) sharing signaling for sidelink communication in unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes selecting, within a resource selection window, a set of resources in which to transmit over an unlicensed sidelink channel; attempting a listen before talk (LBT) procedure to initiate a channel occupancy time (COT) in which to transmit over the unlicensed sidelink channel; adjusting, within at least a portion of the resource selection window, the set of resources in which to transmit over the unlicensed sidelink channel to be contiguous in at least a time domain based at least in part on the LBT procedure succeeding; and transmitting, over the unlicensed sidelink channel, using the set of resources that are adjusted to be contiguous in at least the time domain.

In some aspects, a UE for wireless communication includes a memory and one or more processors operatively coupled to the memory, the memory and the one or more processors configured to: select, within a resource selection window, a set of resources in which to transmit over an unlicensed sidelink channel; attempt an LBT procedure to initiate a COT in which to transmit over the unlicensed sidelink channel; adjust, within at least a portion of the resource selection window, the set of resources in which to transmit over the unlicensed sidelink channel to be contiguous in at least a time domain based at least in part on the LBT procedure succeeding; and transmit, over the unlicensed sidelink channel, using the set of resources that are adjusted to be contiguous in at least the time domain.

In some aspects, a non-transitory computer-readable medium storing a set of instructions for wireless communication includes one or more instructions that, when executed by one or more processors of a UE, cause the UE to: select, within a resource selection window, a set of resources in which to transmit over an unlicensed sidelink channel; attempt an LBT procedure to initiate a COT in which to transmit over the unlicensed sidelink channel; adjust, within at least a portion of the resource selection window, the set of resources in which to transmit over the unlicensed sidelink channel to be contiguous in at least a time domain based at least in part on the LBT procedure succeeding; and transmit, over the unlicensed sidelink channel, using the set of resources that are adjusted to be contiguous in at least the time domain.

In some aspects, an apparatus for wireless communication includes means for selecting, within a resource selection window, a set of resources in which to transmit over an unlicensed sidelink channel; means for attempting an LBT procedure to initiate a COT in which to transmit over the unlicensed sidelink channel; means for adjusting, within at least a portion of the resource selection window, the set of resources in which to transmit over the unlicensed sidelink channel to be contiguous in at least a time domain based at least in part on the LBT procedure succeeding; and means for transmitting, over the unlicensed sidelink channel, using the set of resources that are adjusted to be contiguous in at least the time domain.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
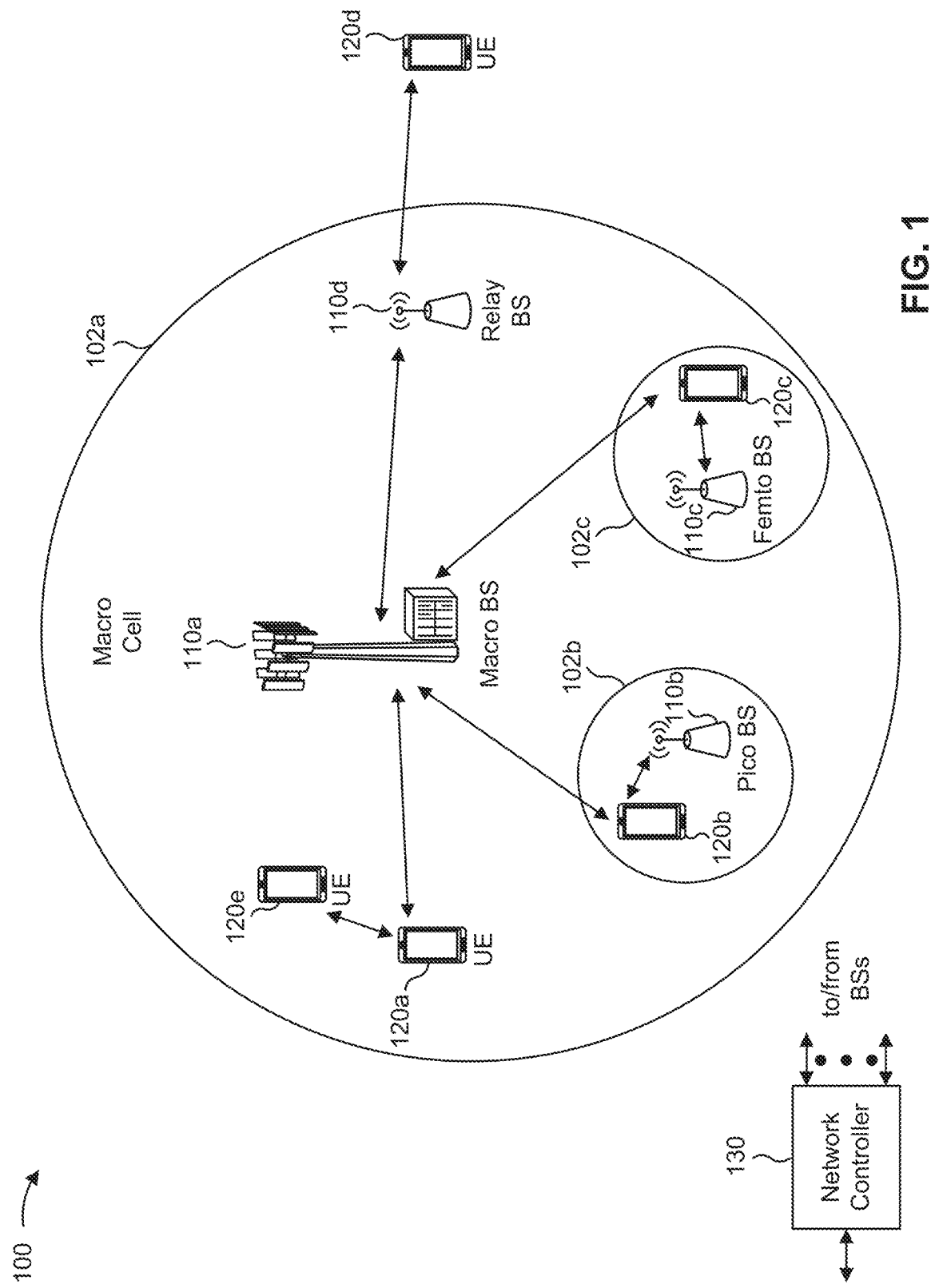
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the operating band that devices of wireless network 100 use to communicate may include an operating band in a licensed radio frequency spectrum and/or an operating band in an unlicensed radio frequency spectrum. For example, a base station 110 and a UE 120 may communicate in an unlicensed radio frequency spectrum using a RAT such as Licensed-Assisted Access (LAA), Enhanced LAA (eLAA), Further Enhanced LAA (feLAA), MulteFire, and/or NR-Unlicensed (NR-U), among other examples. In some aspects, an operating band in an unlicensed radio frequency spectrum may be shared by one or more base stations 110, one or more UEs 120, and/or one or more wireless local area network (WLAN) devices (not shown). Because the operating band in the unlicensed radio frequency spectrum may be shared by devices operating under different protocols (e.g., different RATs), transmitting devices may need to contend for access to the operating band in the unlicensed radio frequency spectrum prior to transmitting over the unlicensed radio frequency spectrum.

For example, in a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as a listen before talk (or listen before transmit) (LBT) procedure or another suitable channel access procedure, for shared or unlicensed frequency band channel access. The channel access procedure may be performed to determine whether the physical channel (e.g., the radio resources of the channel) are free to use or are busy (e.g., in use by another wireless communication device such as another UE, an IoT device, and/or a WLAN device, among other examples). The channel access procedure may include sensing or measuring the physical channel (e.g., performing a reference signal received power (RSRP) measurement, detecting an energy level, or performing another type of measurement) during a channel access gap (which may also be referred to as a contention window) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity (TXOP), which may extend for a channel occupancy time (COT).

As indicated above, FIG. 1 is provided as an example. Other examples may differ from what is described with regard to FIG. 1.

Figure 2:
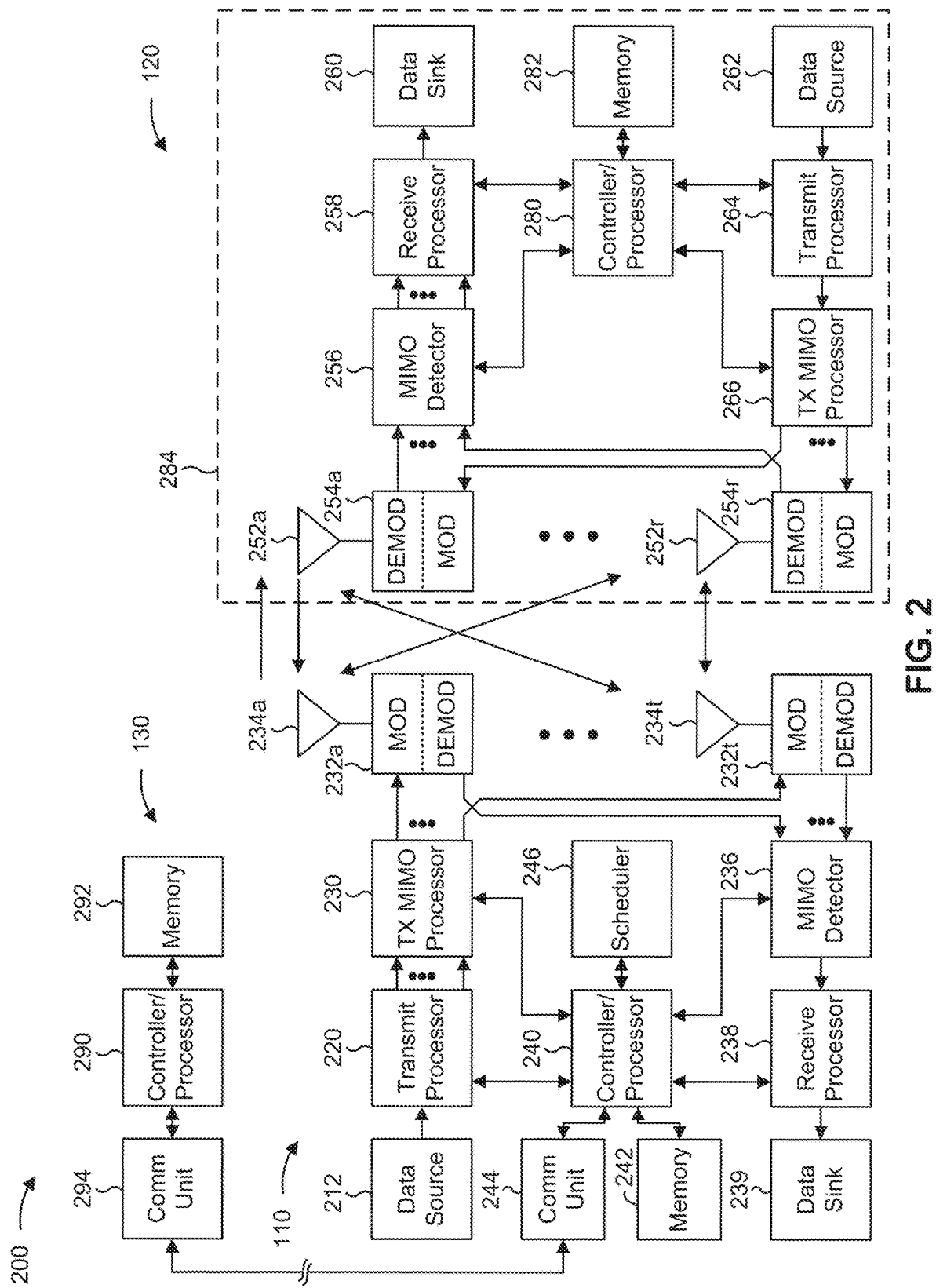
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIG. 5, FIGS. 6A-6B, and/or FIG. 7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate with network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIG. 5, FIGS. 6A-6B, and/or FIG. 7.

Controller/processor 240 of base station 110, controller/processor 280 of UE 120, and/or any other component(s) of FIG. 2 may perform one or more techniques associated with LBT-based resource modification and reduced COT sharing signaling for sidelink communication in unlicensed spectrum, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions, among other examples.

In some aspects, the UE 120 includes means for selecting, within a resource selection window, a set of resources in which to transmit over an unlicensed sidelink channel, means for attempting an LBT procedure to initiate a COT in which to transmit over the unlicensed sidelink channel, means for adjusting, within at least a portion of the resource selection window, the set of resources in which to transmit over the unlicensed sidelink channel to be contiguous in at least a time domain based at least in part on the LBT procedure succeeding, and/or means for transmitting, over the unlicensed sidelink channel, using the set of resources that are adjusted to be contiguous in at least the time domain. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for adjusting, within the portion of the resource selection window, the set of resources in which to transmit over the unlicensed sidelink channel to occupy a minimum number of subchannels that are contiguous in a frequency domain.

In some aspects, the UE 120 includes means for determining a duration between a trigger indicating that the LBT procedure succeeded and an earliest resource in the portion of the resource selection window, and/or means for moving the earliest resource in the portion of the resource selection window to an earlier symbol or slot based at least in part on the duration satisfying a threshold.

In some aspects, the UE 120 includes means for transmitting, over the unlicensed sidelink channel, sidelink control information (SCI) that indicates non-shareable resources within the COT that are reserved for one or more initial transport block transmissions.

In some aspects, the UE 120 includes means for adjusting, within the portion of the resource selection window, the set of resources in which to transmit over the unlicensed sidelink channel to occupy different subchannels based at least in part on a frequency hopping pattern.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
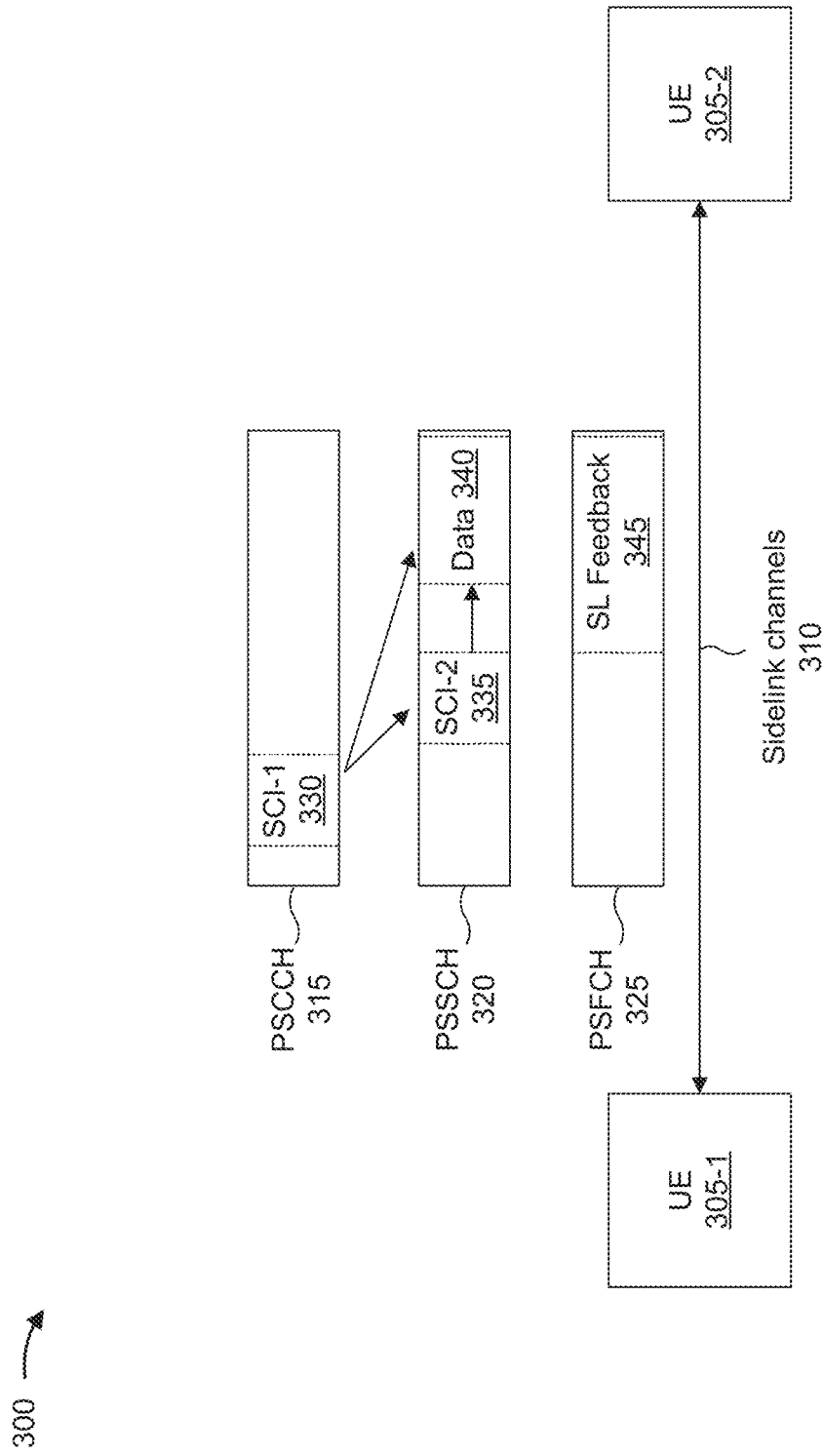
FIG. 3 is a diagram illustrating an example of sidelink communication, in accordance with various aspects of the present disclosure.

FIG. 3 is a diagram illustrating an example 300 of sidelink communication, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface, may operate in a high frequency band (e.g., the 5.9 GHz band), may operate on an unlicensed or shared frequency band (e.g., an NR unlicensed (NR-U) frequency band), and/or the like. Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel.

In some aspects, the PSCCH 315 may carry SCI, which may indicate various control information used for sidelink communications. For example, in some aspects, the SCI may include a stage one SCI (SCI-1) 330, which may include an indication of one or more resources (e.g., time resources, frequency resources, spatial resources, and/or the like) where various types of information may be carried on the PSSCH 320, information for decoding sidelink communications on the PSSCH 320, a quality of service (QoS) priority value, a resource reservation period, a PSSCH demodulation reference signal (DMRS) pattern, an SCI format and a beta offset for stage two sidelink control information (SCI-2) 335 transmitted on the PSSCH 320, a quantity of PSSCH DMRS ports, a modulation coding scheme (MCS), and/or the like.

In some aspects, the information carried on the PSSCH 320 may include the SCI-2 335 and/or data 340. The SCI-2 335 may include various types of information, such as a hybrid automatic repeat request (HARQ) process ID, a new data indicator (NDI) associated with the data 340 carried on the PSSCH 320, a source identifier, a destination identifier, a channel state information (CSI) report trigger, and/or the like. In some aspects, a UE 305 may transmit both the SCI-1 330 and the SCI-2 335. In some aspects, a UE 305 may transmit only SCI-1 330, in which case one or more types of the information that would otherwise be transmitted in the SCI-2 335 may be transmitted in the SCI-1 330 instead.

In some aspects, the PSFCH 325 may be used to communicate sidelink feedback 345, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with regard to FIG. 3.

Figure 4A:
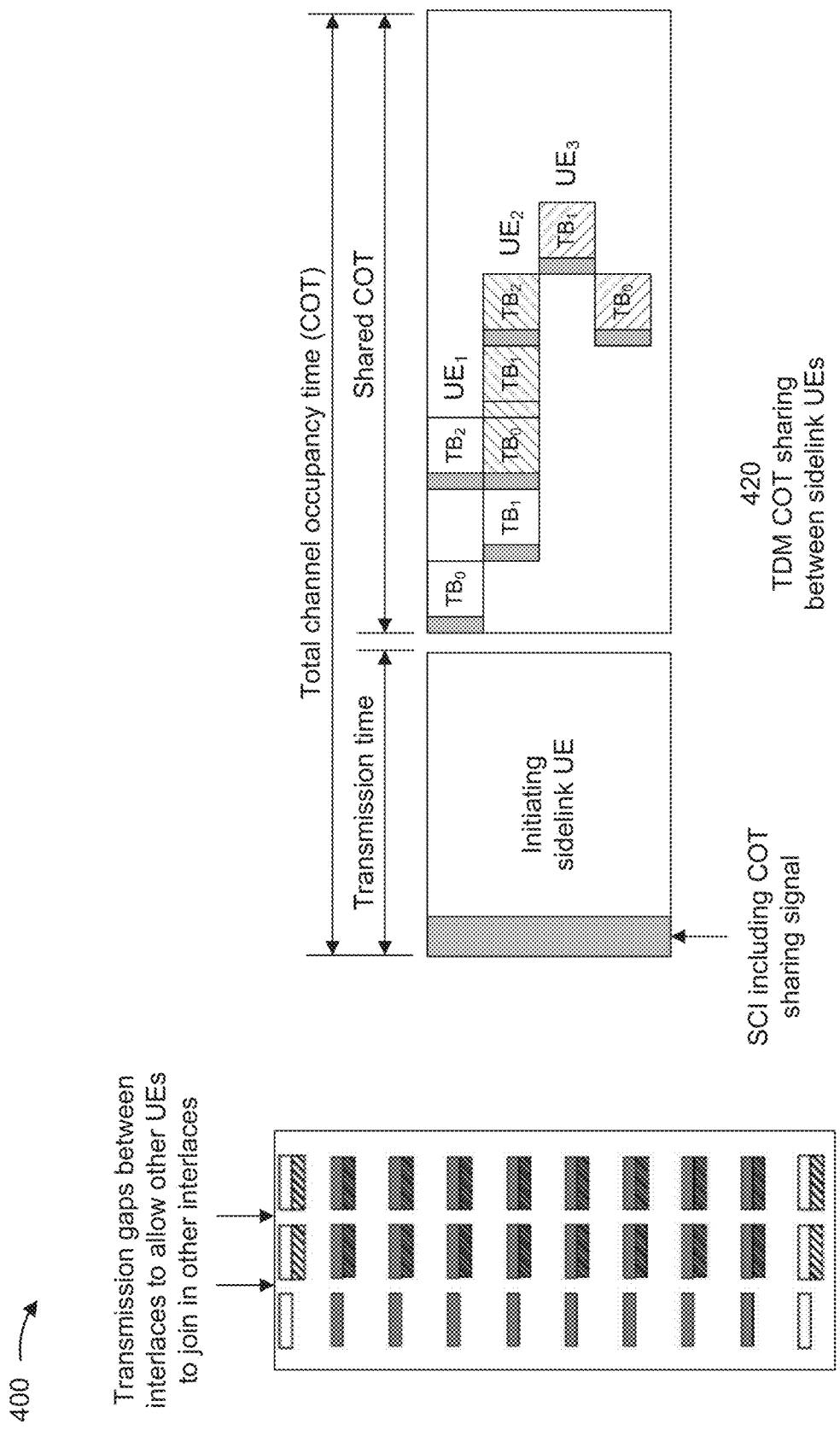
FIGS. 4A-4B are diagrams illustrating examples of channel occupancy time (COT) sharing for sidelink communication in unlicensed spectrum, in accordance with various aspects of the present disclosure.
Figure 4B:
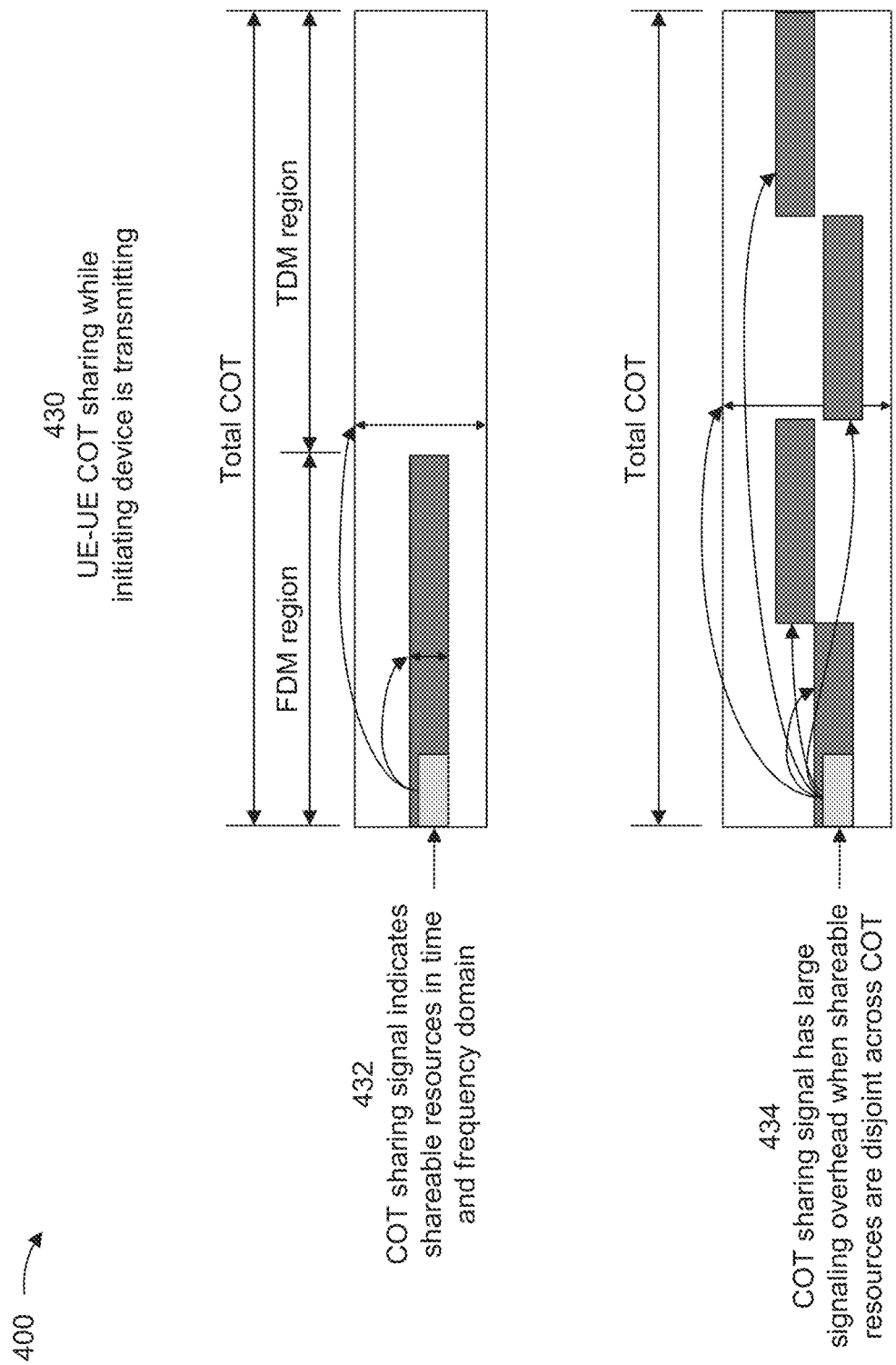

FIGS. 4A-4B are diagrams illustrating examples 400 of COT sharing for sidelink communication in unlicensed spectrum, in accordance with various aspects of the present disclosure.

For example, to accommodate increasing traffic demands, there have been various efforts to improve spectral efficiency in wireless networks and thereby increase network capacity (e.g., via use of higher order modulations, advanced MIMO antenna technologies, and/or multi-cell coordination techniques, among other examples). Another way to potentially improve network capacity is to expand system bandwidth. However, available spectrum in lower frequency bands that have traditionally been licensed or otherwise allocated to mobile network operators has become very scarce. Accordingly, various technologies have been developed to enable operation of a cellular radio access technology (RAT) in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by wireless local area network (WLAN) or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a standalone mode, NR-U enables NR operation in unlicensed spectrum, and/or the like. In general, when operating a cellular RAT in unlicensed spectrum (e.g., using LAA, eLAA, feLAA, MulteFire, and/or NR-U), one challenge that arises is the need to ensure fair coexistence with incumbent (e.g., WLAN) systems that may be operating in the unlicensed spectrum.

For example, prior to gaining access to and/or transmitting over an unlicensed channel, a transmitting device (e.g., base station 110, UE 120, UE 305, and/or the like) that has a packet to transmit may need to perform an LBT procedure to contend for access to the unlicensed channel. The LBT procedure may generally include a clear channel assessment (CCA) procedure that is performed in order to determine whether the unlicensed channel is available (e.g., unoccupied by other transmitters). In particular, the CCA procedure may include detecting an energy level on the unlicensed channel and determining whether the energy level satisfies (e.g., is less than or equal to) a threshold, sometimes referred to as an energy detection threshold and/or the like. When the energy level satisfies (e.g., does not equal or exceed) the threshold, the CCA procedure is deemed to be successful and the transmitting device may gain access to the unlicensed channel for a duration that may be referred to as a channel occupancy time (COT) during which the transmitting device can perform transmissions without performing additional LBT operations. When the energy level does not satisfy the threshold, the CCA procedure is unsuccessful and contention to access the unlicensed channel may be deemed unsuccessful.

When the CCA procedure results in a determination that the unlicensed channel band is unavailable (e.g., because the energy level detected on the unlicensed channel indicates that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

Accordingly, although a wireless network can be configured to use unlicensed spectrum to achieve faster data rates, provide a more responsive user experience, offload traffic from a licensed spectrum, and/or the like, the need to ensure fair coexistence with incumbent systems (e.g., WLAN devices) may hamper efficient usage of the unlicensed spectrum. For example, even when there is no interference, the LBT procedure used to ensure that no other devices are already using the channel introduces a delay before transmissions can start, which may degrade user experience, result in unacceptable performance for latency-sensitive or delay-sensitive applications, and/or the like. Furthermore, these problems may be exacerbated when the initial CCA procedure is unsuccessful, as the transmitting device can transmit on the channel only after performing an additional quantity of CCA procedures and determining that the channel has become clear and remained clear for a random wait period. Furthermore, in some cases, the COT obtained by an initiating transmitting device may have a duration that is longer than necessary for the transmitting device to perform the desired transmissions, which may lead to inefficient usage of the unlicensed channel.

Accordingly, in some cases, a wireless network may enable a COT obtained by a transmitting device to be shared with other nodes in order to improve access, efficiency, and/or the like for an unlicensed channel. For example, in downlink-to-uplink COT sharing over an access link, a base station may acquire a COT with an eCCA, and the COT may be shared with one or more UEs (e.g., UE 120, UE 305, and/or the like) that can then transmit uplink signals within the COT that was acquired by the base station 110. In this case, a UE attempting to initiate an uplink transmission within the COT shared with the base station can perform an uplink transmission without having to perform an LBT procedure (e.g., a Category-1 LBT procedure, also referred to as no LBT), or the UE may perform the uplink transmission after performing a one-shot CCA with a shorter LBT procedure (e.g., a Category-2 LBT procedure when the downlink-to-uplink gap duration is between 16 µs and 25 µs and/or a Category-1 LBT procedure when a downlink-to-uplink gap duration is less than or equal to 16 µs).

Additionally, or alternatively, a wireless network may support uplink-to-downlink COT sharing from a UE to a base station over an access link. For example, a UE may perform a Category-4 LBT procedure to initiate a COT (e.g., for a configured grant PUSCH or a scheduled uplink transmission), which can be shared with the base station via group common uplink control information (GC-UCI) that indicates a starting point and duration of the remaining portion of the COT to be shared with the base station. For example, the UE may perform the Category-4 LBT procedure to initiate a COT having a 4 millisecond (ms) duration, and may only use 1 ms of the COT such that the remaining 3 ms of the COT can be shared with another device. In this case, the base station may need to acquire the remaining portion of the COT immediately after the last transmission by the UE in the earlier (used) portion of the COT by performing Category-1 or Category-2 LBT sensing using a 16 µs gap or a 25 µs gap before the transmission by the base station. In this way, the base station may transmit control and/or broadcast signals and/or channels for any UE served by the base station, provided that the transmission contains a downlink signal, channel, and/or other transmission (e.g., a PDSCH, PDCCH, reference signal, and/or the like) intended to be received by the UE that initiated the COT.

Additionally, or alternatively, a wireless network may support UE-to-UE COT sharing over a sidelink. For example, as shown in FIG. 4A, and by reference number 410, a COT acquired by an initiating UE (e.g., UE 305-1) may be shared with another UE (e.g., UE 305-2) in a frequency division multiplexing (FDM) mode by dividing the COT into multiple interlaces (e.g., time periods during which one or more UEs may perform transmit operations). For example, as shown in FIG. 4A, the initiating UE may use one or more sidelink resources (e.g., time and frequency resources) to transmit in a first interlace after the COT has been acquired, and a responding UE may use sidelink frequency resources that are non-overlapping with sidelink frequency resources used by the initiating UE to perform transmit operations in subsequent interlaces. Accordingly, as shown in FIG. 4A, FDM or interlace-based COT sharing may introduce short transmission gaps between interlaces to allow other UEs to perform transmit operations in subsequent interlaces during a shared COT, and SCI transmitted by the initiating UE may carry information to support the interlace-based COT sharing. For example, SCI that contains COT sharing information may be treated as a COT sharing grant from the initiating UE that is sharing the COT, and all responding UEs that are eligible to share the COT (e.g., based on a distance metric, a group identifier, and/or other information) may take the SCI as a COT sharing grant. In this case, a responding UE may perform a Category-1 or Category-2 LBT procedure prior to transmitting at any time up to the end of the COT, and a transmission gap limit may not apply (e.g., UEs sharing the COT can start to transmit anywhere within the shared COT region even if there is a greater than 25 µs gap between the transmission and the end of the last transmission by the COT-initiating UE).

Additionally, or alternatively, as shown by reference number 420, UE-to-UE COT sharing may be enabled in a time division multiplexing (TDM) mode. In this case, the total COT may be divided into an initial time period during which the initiating UE may perform transmissions, which may include one or more SCI transmissions that include a COT-sharing signal to indicate when the initial transmission will end, a remaining duration of the COT that is available for sharing, and/or the like. Accordingly, one or more responding UEs may monitor the SCI transmitted by other UEs (e.g., the initiating UE) to recover COT sharing information that can be used to perform transmissions during a time period that corresponds to a shared COT.

Accordingly, as described above, UE-to-UE COT sharing may enable better access to unlicensed spectrum, more efficient usage of unlicensed spectrum, and/or the like by enabling multiple UEs to perform transmissions during a COT that is obtained by an initiating UE (e.g., a UE that successfully performed a Category-4 LBT procedure to acquire access to an unlicensed channel). However, in some cases, implementing UE-to-UE COT sharing using the FDM and/or TDM schemes shown in FIG. 4A may be associated with inefficient resource usage. For example, in the FDM and TDM schemes shown in FIG. 4A, the UE initiating the COT generally finishes transmitting at the beginning of the COT and then shares the remaining (unused) portion of the COT with other UEs. As a result, there may be inefficient usage of frequency resources in the earlier (used) portion of the COT. For example, the UE initiating the COT may occupy only one or two subchannels and/or interlaces in the used portion of the COT, meaning that other UEs could potentially conduct simultaneous transmissions in the used portion of the COT using subchannels and/or interlaces that are not occupied by the COT-initiating UE (e.g., because a sidelink UE is not expected to perform unicast transmissions to multiple UEs at the same time, and therefore does not need to utilize all available frequency resources).

Accordingly, some aspects described herein may enable UE-to-UE COT sharing during a used portion of a shared COT (e.g., while the initiating UE is still transmitting). For example, as shown in FIG. 4B, and by reference number 430, UE-to-UE COT sharing while the COT-initiating UE is transmitting may be enabled by dividing a COT initiated by a UE into an FDM region in which the COT-initiating UE reserves a set of time and frequency resources reserved to transmissions by the COT-initiating UE and a TDM region in which other UEs sharing the COT may transmit. In this case, as shown by reference number 432, SCI may include a COT sharing signal (e.g., COT system information (COT-SI)) that indicates shareable resources in a time and frequency domain. For example, in FIG. 4B, the shaded rectangles may indicate shareable resources that other UEs can use to transmit without colliding with non-shareable resources reserved for transmissions by the COT-initiating UE.

Although this approach may improve resource utilization within a shared COT by allowing other UEs to join and conduct transmissions over the unlicensed channel concurrently with the COT-initiating UE, the COT sharing signal may be associated with a large overhead in cases where the shareable resources are disjoint and varying across the COT. For example, the UE initiating the COT may select different subchannels that are used for transmissions in different slots or symbols within the COT in order to gain frequency diversity. Furthermore, the UE may use a legacy sidelink resource selection algorithm to randomly select subchannels and/or slots within a resource selection window, which generally makes the shareable resources highly disjoint. Accordingly, as shown by reference number 434, the COT sharing signal may have a large overhead in cases where the shareable resources are disjoint across the shared COT (e.g., because the COT sharing signal needs to indicate a rectangle that corresponds to each set of shareable resources in the time and frequency domain and needs to further indicate the TDM region that occurs after the COT-initiating UE has finished transmitting). The potentially large overhead of the COT sharing signal may be especially problematic in a sidelink configuration, where the COT sharing signal may be carried in SCI-1 to enable a reduced processing timeline and power saving. For example, SCI-1 is carried over a PSCCH and has a small payload size to enable decoding by all UEs, and may therefore be unable to accommodate a COT sharing signal with a large payload. Furthermore, SCI-2 carried over a PSSCH may be unsuitable to carry the COT sharing signal because SCI-2 is not decoded by all UEs and/or some UEs may lack capabilities to support SCI-2.

Some aspects described herein relate to techniques and apparatuses to enable an LBT-based resource modification and reduced COT sharing signaling for sidelink communication in unlicensed spectrum. For example, as described herein, a UE that has one or more packets to transmit may initially perform random resource selection within a resource selection window, as the UE may be unable to determine prior to a successful LBT procedure whether the resources that are selected will be within a COT initiated by the UE or piggybacked on a shared COT initiated by a different UE. In some aspects, the UE may attempt an LBT procedure (e.g., a Category-4 LBT procedure), and may rearrange or otherwise adjust the resources that were initially selected to be contiguous in a time domain and/or clustered in a frequency domain based on the LBT procedure succeeding. In this way, the UE may transmit SCI including a COT sharing signal to block other UEs from performing interfering transmissions in the used COT region with contiguous and/or clustered transmission, and adjusting the reserved resources to be contiguous in the time domain and/or clustered in frequency domain may enable a reduced overhead for signaling the shareable resources. For example, the UE initiating the COT may transmit SCI to indicate non-shareable resources (e.g., the time and frequency resources reserved to initial transmissions by the UE), and responding UEs may select other resources, excluding the non-shareable resources, to use for transmissions in the used portion of the shared COT. Additionally, or alternatively, the UE may select non-shareable resources according to a frequency hopping pattern, and the SCI indicating non-shareable resources may include information to enable responding devices to derive the frequency hopping pattern used by the COT-initiating UE (and therefore the resources to exclude when selecting resources in the used region of the shared COT).

As indicated above, FIGS. 4A-4B are provided as examples. Other examples may differ from what is described with regard to FIGS. 4A-4B.

Figure 5:
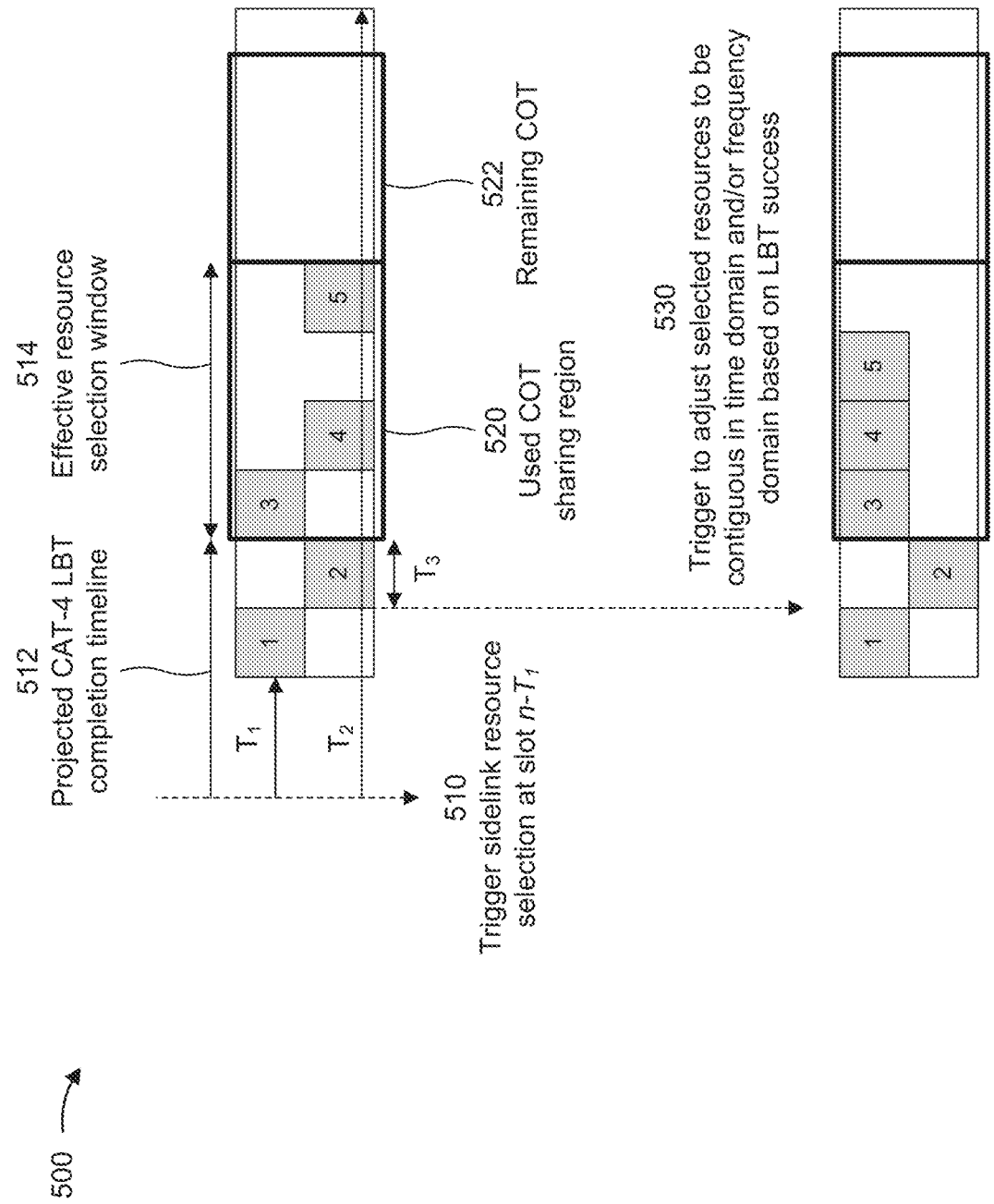
FIG. 5 is a diagram illustrating an example associated with listen before talk (LBT) based resource modification for sidelink communication in unlicensed spectrum, in accordance with various aspects of the present disclosure.

FIG. 5 is a diagram illustrating an example 500 associated with LBT-based resource modification for sidelink communication in unlicensed spectrum, in accordance with various aspects of the present disclosure.

For example, as shown by reference number 510, a UE may trigger a sidelink resource selection in a slot $n-T_1$, where $n-T_1$ is a time when one or more packets corresponding to one or more initial transport block transmissions arrive, and $T_1$ is duration between the time when the one or more arrive the UE and a time when a first packet is to be transmitted. In some aspects, when the one or more packets arrive at the UE, the UE may determine whether there is a shared COT available to exploit (e.g., within a duration $T_2$ after the time when the one or more packets arrive at the UE). In cases where the UE determines that another shared COT is available, the UE may transmit the one or more packets in the shared COT (e.g., by performing a Type-0 random resource selection in an effective resource selection window that is defined for a remaining COT shared by another UE based at least in part on a COT sharing signal transmitted by the other UE that initiated the shared COT).

Alternatively, in cases where the UE determines that a shared COT is unavailable, the UE may perform random resource selection in a projected used COT region. For example, as shown in FIG. 5, the UE may determine a projected Category-4 LBT completion timeline 512 (e.g., a projected duration for performing a successful Category-4 LBT procedure needed to initiate a COT), and may further determine a resource selection window that covers a time period associated with the packets to be transmitted by the UE. For example, in FIG. 5, five (5) packets numbered 1-5 may arrive at the UE, and a time period in which the 5 packets are to be transmitted may define the resource selection window. However, because the UE may be required to perform a successful Category-4 LBT procedure before transmitting, an effective resource selection window 514 may encompass a reduced portion of the overall resource selection window that accounts for the projected Category-4 LBT completion timeline 512. For example, the UE may perform a Type-1 random resource selection in the effective resource selection window 514, which generally corresponds to a projected used COT sharing region 520 (e.g., a region of a COT that is used for transmission by the initiating UE and shared with other UEs). In this case, a portion of the projected COT that occurs after the transmissions that are scheduled for the UE (e.g., after the projected used COT sharing region 520) may be a remaining COT region 522 that other UEs can join by performing a successful Category-1 or Category-2 LBT procedure.

Accordingly, as shown in FIG. 5, the UE may perform a random resource selection within the effective resource selection window 514 corresponding to the projected used COT sharing region 520. For example, among the five packets that arrive in slot $n-T_1$, the UE may perform random resource selection for the three packets that are in the effective resource selection window 514 corresponding to the projected used COT sharing region 520. Accordingly, resources for the first two packets (numbered 1 and 2) are excluded from the random resource selection because the first two packets are within a projected contention window countdown dead zone (e.g., occur during the projected Category-4 LBT completion timeline). For example, resource selection is performed at a medium access control (MAC) layer and the LBT procedure is performed at a physical (PHY) layer, which can result in uncertainty as to when the effective resource selection window 514 is to begin. For example, the MAC layer may select a contention window based on a priority class associated with the traffic to be transmitted, and the PHY layer may randomly select a countdown value for performing the LBT procedure based on the value of the contention window indicated by the MAC layer. Accordingly, the MAC layer may be unable to determine the countdown value used by the PHY layer, the MAC layer may perform the initial random resource selection within the effective resource selection window 514 based on the maximum duration for the projected Category-4 LBT completion timeline 512.

Accordingly, in cases where the UE attempts and performs a successful Category-4 LBT procedure to initiate a COT, the UE may generally start to transmit on one or more subchannels in the used COT sharing region 520. In such cases, the transmissions by the UE may block other nearby UEs from performing a successful Category-4 LBT procedure on each of the subchannels that are occupied by the UE. As described above, this may result in inefficient usage of frequency resources and/or may lead to COT sharing signaling having a large overhead. For example, random resource selection at the initial stage (e.g., prior to the UE performing a successful Category-4 LBT procedure to initiate a COT) may be useful to reduce a probability that the resource(s) selected by the UE will collide with non-shareable resources in a COT initiated by another UE (e.g., because the UE initially cannot know whether the randomly selected resource(s) will be in a COT initiated by the UE or piggybacked in an FDM mode in a used COT region shared with another initiating UE. However, if another shared COT is unavailable to exploit and the UE is able to perform a successful Category-4 LBT procedure, the UE does not have to respect resources that may be reserved by other UEs and may select any suitable resources in the COT that was initiated by the UE. In other words, the random resource selection algorithm that the UE employs to perform the initial resource selection is generally designed to avoid collisions in licensed spectrum, but avoiding such collisions is unnecessary in unlicensed spectrum because the Category-4 LBT procedure ensures that there are no other devices transmitting on the unlicensed subchannels.

Accordingly, as shown by reference number 530, the UE may trigger an adjustment to the selected resources within the effective resource selection window 514 based at least in part on a successful Category-4 LBT procedure. In some aspects, the UE may trigger the adjustment based at least in part on determining that an attempted Category-4 LBT procedure was successful, and that the LBT success occurred at least $n-T_3$ before a preselected resource (e.g., a resource selected at slot n) is confirmed, where $T_3$ is a minimum duration prior to a transmission when resource reselection or modification at the PHY layer is feasible. In this case, as shown in FIG. 5, the preselected resources are adjusted to be contiguous in a time domain, and may be further adjusted to occupy a minimum number of subchannels. For example, one or more preselected resources that occur later within the effective resource selection window 514 may be moved to earlier time resources (e.g., earlier symbols or slots) to close transmission gaps, and subchannels associated with preselected resources that occur later within the effective resource selection window 514 may be aligned with a subchannel associated with a first resource within the effective resource selection window 514. For example, as shown in FIG. 5, resource 4 is aligned with a subchannel selected for resource 1, and resource 5 is moved to a preceding slot to close a transmission gap and also aligned with the subchannel selected for resource 1. Additionally, or alternatively, in cases where a particular subchannel is occupied in a given slot, another resource in the same slot may be moved to an adjacent subchannel such that the resources occupy a minimum number of subchannels. Furthermore, in some aspects, the selected resources may be adjusted such that a 16 μs gap is provided between consecutive transmissions in order to allow other UEs to perform a Category-2 LBT procedure to transmit in the used COT sharing region 520. Accordingly, because resources 4 and 5 are adjusted in the time and/or frequency domain, the adjustment may be triggered if the Category-4 LBT procedure succeeds at least $T_3$ prior to the time resources associated with resources 4 and 5.

In some aspects, the adjustment to the resource selection may be associated with one or more initial transport block transmissions, and any resources previously reserved for retransmissions by the UE initiating the COT may be maintained. For example, the resources previously reserved for retransmissions by the initiating UE may be indicated in SCI-1 that other UEs may be in the process of decoding. Accordingly, other UEs that join the COT may respect the resource reservation(s) for the retransmissions even if the reserved resources are in a shareable resource region, as described in more detail below. In this case, where one or more resources reserved for a retransmission are in the same subchannel occupied by a first prescheduled resource within the used COT sharing region 520, the first prescheduled resource may be adjusted to occupy the same slot as the resource(s) reserved for a retransmission in a next available subchannel adjacent to the subchannel reserved for the retransmission. In this way, the adjustment to the resource selection ensures contiguous transmission within the used COT sharing region 520, as the retransmission on reserved resources may or may not occur (e.g., depending on HARQ feedback for the initial transmission).

In some aspects, as described above, the Category-4 LBT procedure may be performed at the PHY layer, which may trigger the MAC layer to perform the resource modification to adjust the preselected resources to be contiguous in the time domain and/or the frequency domain when the Category-4 LBT procedure is successful. For example, at the time that the resources are preselected, the preselected resources are unconfirmed (e.g., because the Category-4 LBT procedure may fail) and are not indicated as reserved resources in SCI that is transmitted over-the-air to other UEs. Accordingly, the resource reselection or modification may be triggered at the MAC layer based at least in part on the successful Category-4 LBT procedure occurring at least $T_3$ ahead of a resource that is adjusted in the time domain and/or the frequency domain, where $T_3$ is a minimum duration to process the resource adjustment. Furthermore, in some aspects, the MAC layer may adjust the first resource (e.g., a reference resource that defines the subchannel to which later resources are moved) in cases where a duration between a trigger indicating that the Category-4 LBT succeeded and a start of the first resource satisfies (e.g., equals or exceeds) a threshold. For example, as described above, the projected Category-4 LBT completion timeline 512 may be based on a worst-case scenario (e.g., the PHY layer selecting a maximum countdown value), whereby the Category-4 LBT procedure may be successful earlier than the projected Category-4 LBT completion timeline 512 that is determined by the MAC layer. For example, when the MAC layer signals a contention window value to the PHY layer, the PHY layer selects a random number, q, between zero and the contention window value, and the MAC layer determines the projected Category-4 LBT completion timeline 512 based on the maximum value for q (e.g., the contention window value). When q counts down to zero, the PHY layer attempts the Category-4 LBT procedure and may trigger the MAC layer to perform resource modification if the Category-4 LBT procedure is successful. Accordingly, if a duration between the trigger received at the MAC layer to indicate a Category-4 LBT success and the first (reference) resource in the effective resource selection window 514 satisfies a threshold (e.g., equals or exceeds $T_3$), the MAC layer may move the first resource to an earlier slot and later resources within the effective resource selection window 514 may be adjusted accordingly (e.g., moved to earlier slots to be contiguous with the first resource in at least the time domain).

As indicated above, FIG. 5 is provided as an example. Other examples may differ from what is described with regard to FIG. 5.

Figure 6A:
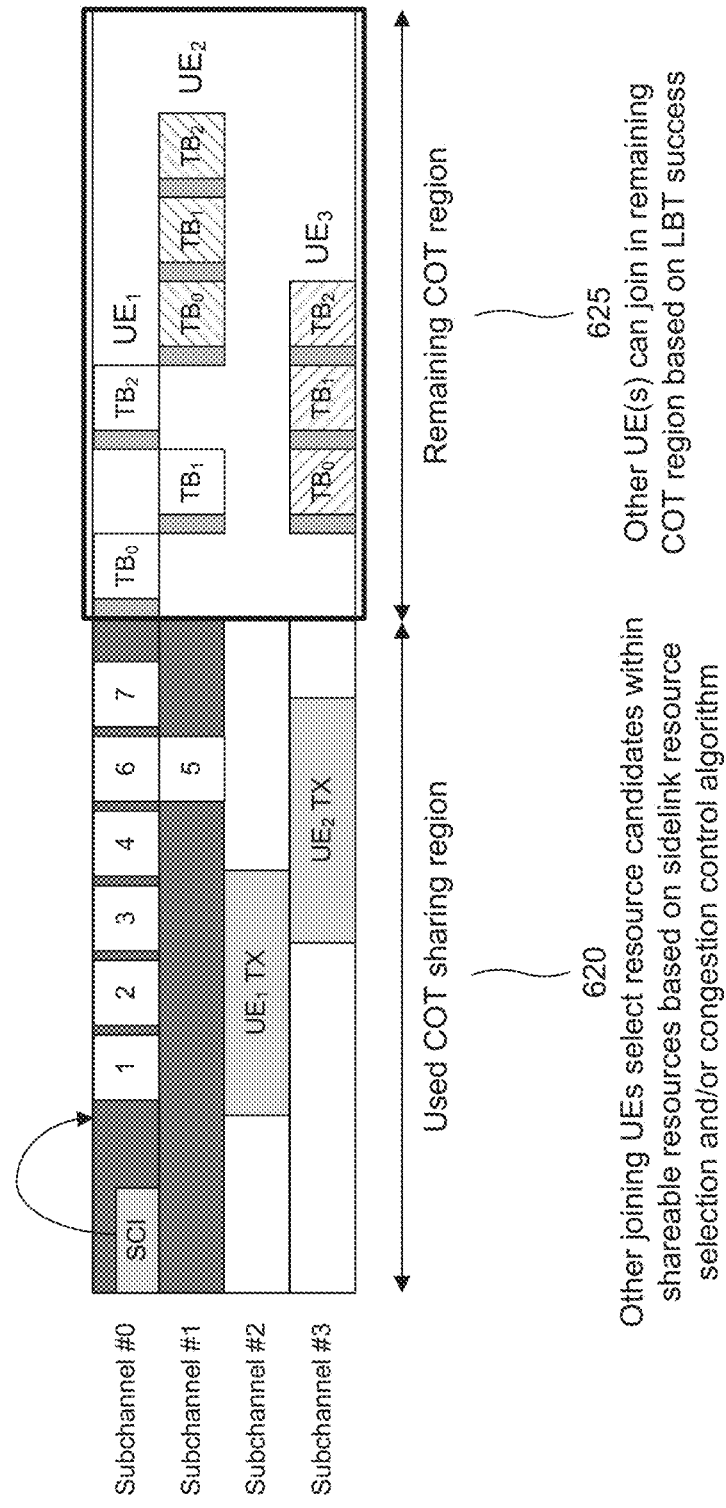
FIGS. 6A-6B are diagrams illustrating examples associated with reduced COT sharing signaling for sidelink communication in unlicensed spectrum, in accordance with various aspects of the present disclosure.
Figure 6B:
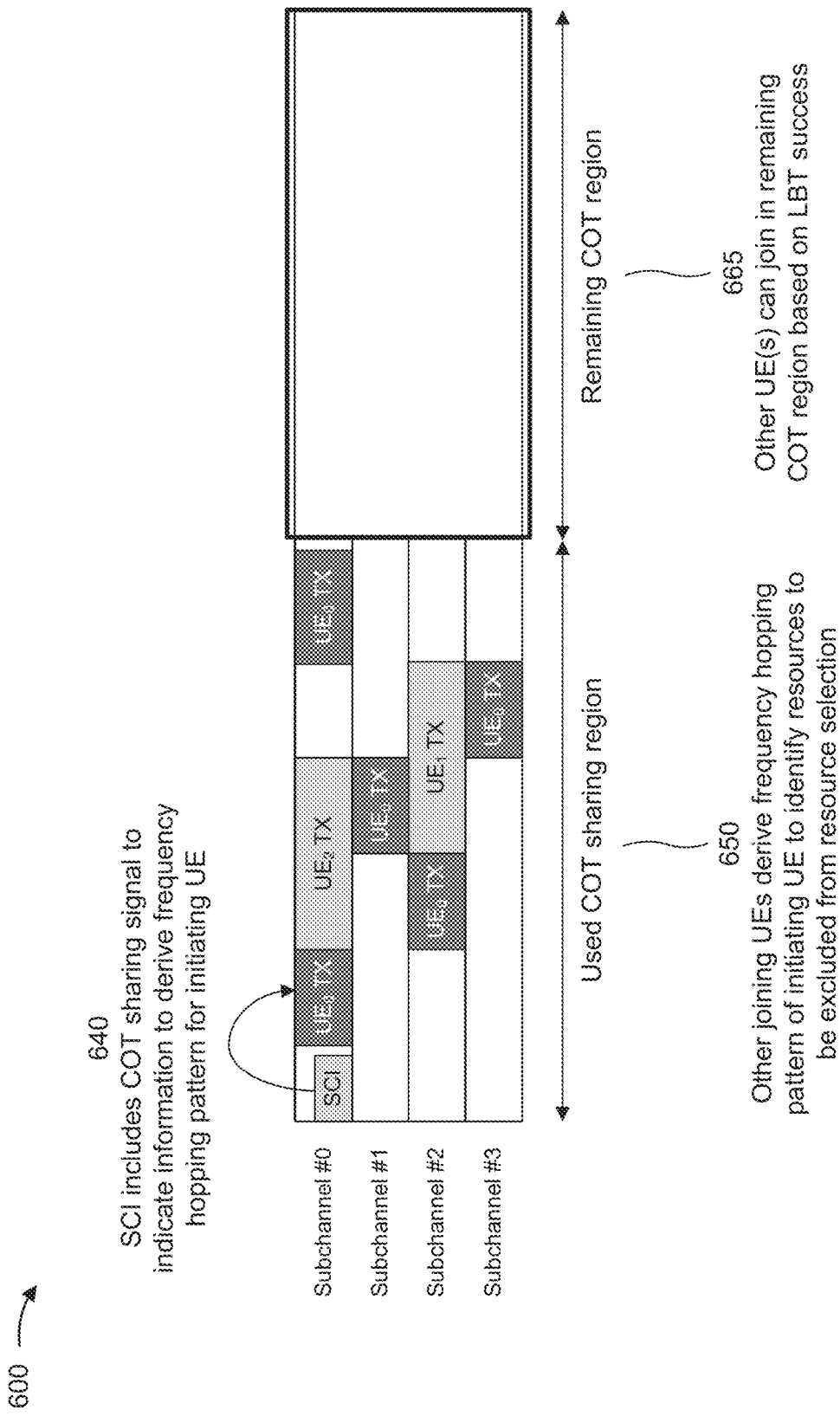

FIGS. 6A-6B are diagrams illustrating examples 600 associated with reduced COT sharing signaling for sidelink communication in unlicensed spectrum, in accordance with various aspects of the present disclosure.

For example, as shown in FIGS. 6A-6B, a UE that performs a successful Category-4 LBT procedure may initiate a COT that includes an initial portion, which may be referred to herein as a used COT sharing region, in which the UE conducts one or more transmissions. As further shown in FIGS. 6A-6B, the COT initiated by the UE may include a later portion (after the last transmission by the initiating UE) that is shared with other UEs, which may be referred to herein as a remaining COT region. As described in further detail above with reference to FIG. 5, a UE that initiates a COT may adjust a set of resources that are reserved to initial transport block transmissions to be contiguous in a time domain and/or a frequency domain based at least in part on a successful Category-4 LBT procedure. In this way, the adjustment to the (initially random) resource selection may result in the resources reserved to the initial transport block transmissions being less disjoint. Accordingly, as described herein, adjusting the resources within the used COT sharing region to be contiguous in the time and/or frequency domain may enable compact signaling to indicate the occupied resources that are reserved for the initiating UE. In this way, the UE may transmit a COT sharing signaling in SCI-1 to reduce a processing timeline and reduce complexity and/or power consumption (e.g., because SCI-1 has a small payload size and is decoded by all UEs).

For example, as shown by reference number 610, the UE that initiates the COT (e.g., $UE_0$) may transmit SCI that includes a COT sharing signal to indicate non-shareable (e.g., occupied) resources in the used COT sharing region. In general, as described above, the non-shareable resources indicated in the COT sharing signal may be associated with one or more initial transport block transmissions. For example, retransmission resources may be reserved by SCI-1 that the UE transmits over-the-air prior to initiating the COT, and other UEs may already be decoding the SCI-1 that indicates the reserved retransmission resources before the COT is initiated. Accordingly, at the time that the resources are selected for the retransmission, the UE may avoid placing the retransmission resources in a fixed subchannel because the UE cannot determine at that time whether the retransmissions will be transmitted in a COT shared by another UE or a COT initiated by the UE. Furthermore, in cases where the retransmissions are in an FDM (used COT sharing) region associated with another UE, the retransmission could potentially collide with non-shareable resources reserved by the COT-sharing UE. Accordingly, random resource selection may be performed for retransmissions to reduce a probability of collisions with non-shareable resources reserved by a COT-sharing UE. However, for initial transport block transmissions, the pre-selected resources may be adjusted to be contiguous in the time domain and/or the frequency domain in order to reduce the number of non-shareable resources, which may enable reduced COT sharing signaling.

For example, as described above, the UE that initiates the COT adjusts the resources to be contiguous within the used COT sharing region in at least the time domain based on a successful Category-4 LBT procedure, and may further adjust the resources to be contiguous in the frequency domain (e.g., occupying the same subchannel or adjacent subchannels). For example, as shown in FIG. 6A, the UE initiating the COT has adjusted a set of resources to be contiguous in time (e.g., back-to-back), and all resources are aligned with the subchannel selected for the first resource (subchannel #0) except for a fifth resource that is contemporaneous with a sixth resource. Accordingly, in this case, the fifth resource is assigned to a subchannel that is adjacent to the subchannel selected for the first resource (subchannel #1). In this case, the resource allocation in the used COT sharing region is contiguous in the time domain and the frequency domain, whereby the COT sharing signal in the SCI may signal a starting subchannel and an ending subchannel that the new transport blocks are occupying in the used COT sharing region. In other words, the COT sharing signal indicates a minimum rectangle (e.g., a starting and ending subchannel, and a starting and ending symbol or slot) that the new transport blocks are occupying in the used COT sharing region. Accordingly, the COT sharing signal may indicate that the UE initiating the COT is committed to not occupy resources for initial transmissions outside the minimum rectangle that defines the resources occupied by the new transport blocks (although resources previously reserved for retransmissions may be outside the starting and ending subchannels and/or the starting and ending transmission time intervals). Additionally, or alternatively, one or more SCI transmissions at the beginning of the COT may indicate the maximum subchannels, interlaces, and/or resource block (RB) sets that are occupied by the new transport blocks within the used COT sharing region.

Accordingly, in some aspects, the SCI may generally indicate the non-shareable resources that are reserved for new transport block transmissions by the COT-initiating UE, whereby shareable resources may include all resources in the RB sets that cleared the Category-4 LBT procedure excluding the non-shareable resources indicated in the SCI. In this way, as shown by reference number 620, other UEs joining the COT may select resource candidates within the shareable resources according to a default sidelink resource selection algorithm (e.g., random resource selection). Furthermore, to the extent that any resources reserved to retransmissions by the COT-initiating UE fall within the shareable resources, the sidelink resource selection or reselection algorithm may be designed to resolve any such collisions (e.g., by avoiding previously reserved resources and/or overriding the previous resource reservation with a high priority transmission). Furthermore, in cases where multiple UEs are joining in the used COT sharing region, a sidelink congestion control algorithm may be used to limit collisions on the shareable resources within the used COT sharing region. As further shown by reference number 625, in the remaining COT region, other UEs may join with a Category-1 or Category-2 LBT procedure, as described above. For example, different UEs can share the COT using a TDM configuration across different slots and/or an FDM configuration on different subchannels and/or interlaces. In an FDM mode, gaps may be provided at slot boundaries for a transmission burst to provide later joining UEs an opportunity to clear LBT and join in transmitting during the remaining COT region.

In general, in the example described above with reference to FIG. 6A, a COT-initiating UE that performs a successful Category-4 LBT procedure adjusts an initially selected (or preselected) set of resources to be contiguous in the time domain and further adjusts the set of resources to occupy the same subchannel or adjacent subchannels. Accordingly, adjusting the set of resources to be contiguous may enable COT sharing signaling with a reduced overhead because the COT-initiating UE can indicate shareable resources by signaling non-shareable resources according to a starting and ending subchannel. However, adjusting the set of resources to be contiguous in the frequency domain (e.g., occupying adjacent subchannels) sacrifices gains that may be achieved through frequency diversity, which may be problematic for a non-interlaced waveform. Accordingly, as shown in FIG. 6B, the COT-initiating UE may follow a frequency hopping pattern over different subchannels when transmitting in the used COT sharing region. In this case, the frequency hopping pattern may be a function of one or more identifiers, such as an identifier associated with the UE and/or a slot index, among other examples. In some aspects, the function may be known to all of the sidelink UEs (e.g., based on a wireless communication standard and/or sidelink signaling exchanged between the UEs, among other examples).

Accordingly, as shown by reference number 640, the SCI transmitted by the COT-initiating UE may include a COT sharing signal that indicates information to enable other UEs to derive the frequency hopping pattern used by the COT-initiating UE. For example, as shown, the COT may cover multiple subchannels in different slots, and the frequency hopping pattern may define a frequency location for a first allocated subchannel, with subsequent frequency locations depending on the frequency location for the first allocated subchannel. Accordingly, the COT sharing signal transmitted by the COT-initiating UE may include the identifier that the COT-initiating UE used to derive the frequency hopping pattern. In this way, as shown by reference number 650, other UEs joining the COT may derive the frequency hopping pattern of the initiating UE based at least in part on the COT sharing signal, and may select resource candidates that exclude the frequency locations occupied by the COT-initiating UE. Furthermore, as shown by reference number 655, in the remaining COT region, other UEs may join with a Category-1 or Category-2 LBT procedure in a similar manner as described above. In this way, the COT-initiating UE may utilize frequency hopping to achieve a frequency diversity gain, and the COT sharing signal may have a low overhead because the only information to be signaled is the identifier used to derive the frequency hopping pattern.

As indicated above, FIGS. 6A-6B are provided as examples. Other examples may differ from what is described with regard to FIGS. 6A-6B.

Figure 7:
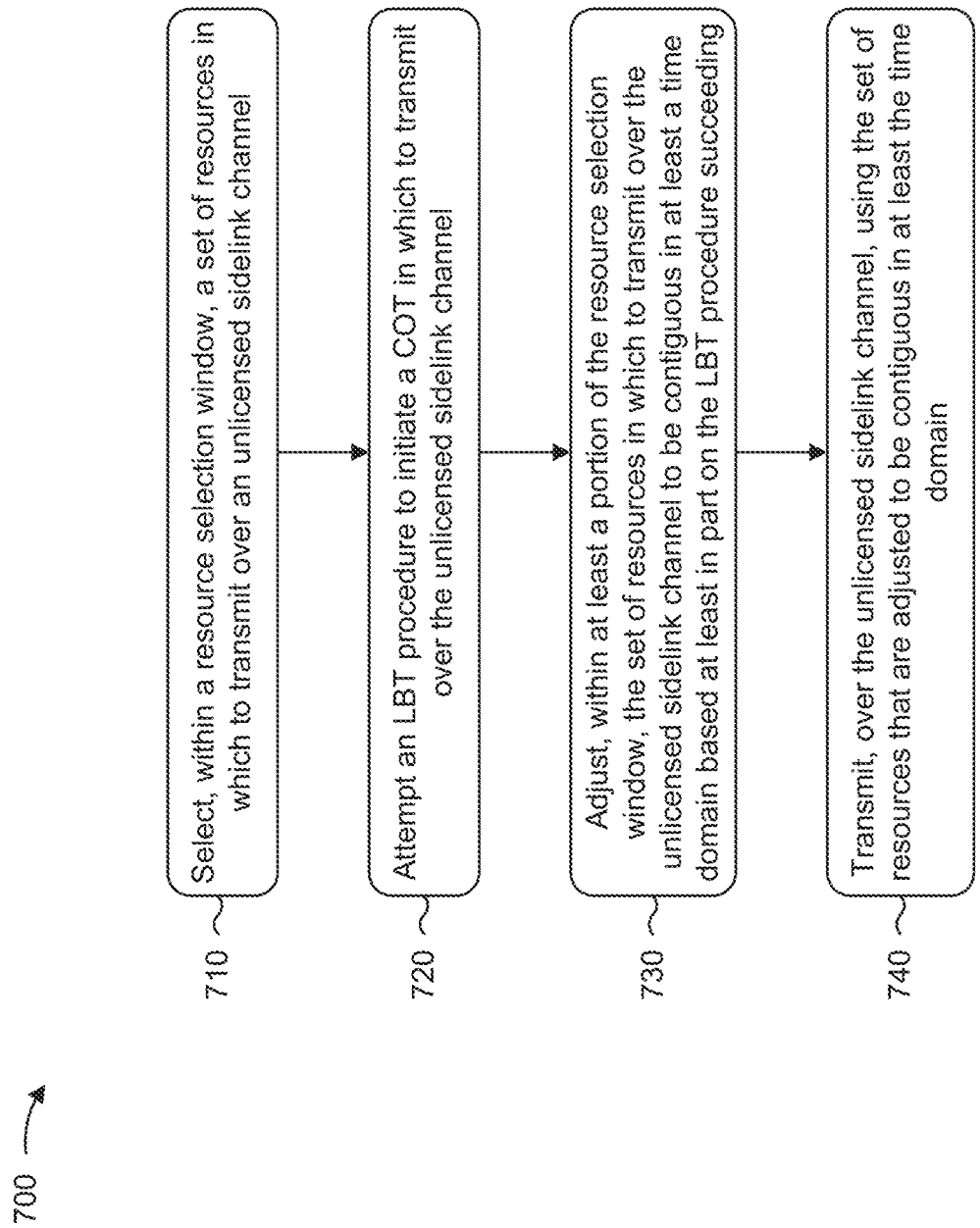
FIG. 7 is a diagram illustrating an example process associated with LBT-based resource modification and reduced COT sharing signaling for sidelink communication in unlicensed spectrum, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or UE 305, among other examples) performs operations associated with LBT-based resource modification and reduced COT sharing signaling for sidelink communication in unlicensed spectrum.

As shown in FIG. 7, in some aspects, process 700 may include selecting, within a resource selection window, a set of resources in which to transmit over an unlicensed sidelink channel (block 710). For example, the UE (e.g., using resource configuration component 808, depicted in FIG. 8) may select, within a resource selection window, a set of resources in which to transmit over an unlicensed sidelink channel, as described above.

As further shown in FIG. 7, in some aspects, process 700 may include attempting an LBT procedure to initiate a COT in which to transmit over the unlicensed sidelink channel (block 720). For example, the UE (e.g., using LBT component 810, depicted in FIG. 8) may attempt an LBT procedure to initiate a COT in which to transmit over the unlicensed sidelink channel, as described above.

As further shown in FIG. 7, in some aspects, process 700 may include adjusting, within at least a portion of the resource selection window, the set of resources in which to transmit over the unlicensed sidelink channel to be contiguous in at least a time domain based at least in part on the LBT procedure succeeding (block 730). For example, the UE (e.g., using resource configuration component 808, depicted in FIG. 8) may adjust, within at least a portion of the resource selection window, the set of resources in which to transmit over the unlicensed sidelink channel to be contiguous in at least a time domain based at least in part on the LBT procedure succeeding, as described above.

As further shown in FIG. 7, in some aspects, process 700 may include transmitting, over the unlicensed sidelink channel, using the set of resources that are adjusted to be contiguous in at least the time domain (block 740). For example, the UE (e.g., using transmission component 804, depicted in FIG. 8) may transmit, over the unlicensed sidelink channel, using the set of resources that are adjusted to be contiguous in at least the time domain, as described above.

Process 700 may include additional aspects, such as any single aspect or any combination of aspects described below and/or in connection with one or more other processes described elsewhere herein.

In a first aspect, process 700 includes adjusting, within the portion of the resource selection window, the set of resources in which to transmit over the unlicensed sidelink channel to occupy a minimum number of subchannels that are contiguous in a frequency domain.

In a second aspect, alone or in combination with the first aspect, one or more resources that are later in the time domain are adjusted to be contiguous in one or more of the time domain or a frequency domain with an earliest resource within the portion of the resource selection window.

In a third aspect, alone or in combination with one or more of the first and second aspects, the set of resources that are adjusted within the portion of the resource selection window are preselected for one or more initial transport block transmissions.

In a fourth aspect, alone or in combination with one or more of the first through third aspects, the set of resources are adjusted at a MAC layer based at least in part on a trigger at a PHY layer indicating that the LBT procedure succeeded.

In a fifth aspect, alone or in combination with one or more of the first through fourth aspects, adjusting the set of resources includes determining a duration between the trigger indicating that the LBT procedure succeeded and an earliest resource in the portion of the resource selection window, and moving the earliest resource in the portion of the resource selection window to an earlier symbol or slot based at least in part on the duration satisfying a threshold.

In a sixth aspect, alone or in combination with one or more of the first through fifth aspects, process 700 includes transmitting, over the unlicensed sidelink channel, SCI that indicates non-shareable resources within the COT that are reserved for one or more initial transport block transmissions.

In a seventh aspect, alone or in combination with one or more of the first through sixth aspects, the SCI indicates the non-shareable resources based at least in part on a starting subchannel and an ending subchannel reserved for the one or more initial transport block transmissions.

In an eighth aspect, alone or in combination with one or more of the first through seventh aspects, the SCI further indicates a maximum set of occupied subchannels, interlaces, or RB sets in the COT.

In a ninth aspect, alone or in combination with one or more of the first through eighth aspects, shareable resources within the COT include all resources in the maximum set of occupied subchannels, interlaces, or RB sets, excluding the non-shareable resources.

In a tenth aspect, alone or in combination with one or more of the first through ninth aspects, process 700 includes adjusting, within the portion of the resource selection window, the set of resources in which to transmit over the unlicensed sidelink channel to occupy different subchannels based at least in part on a frequency hopping pattern.

In an eleventh aspect, alone or in combination with one or more of the first through tenth aspects, the frequency hopping pattern is based at least in part on one or more identifiers associated with the UE, and the SCI includes the one or more identifiers associated with the UE to indicate the non-shareable resources that are reserved for the one or more initial transport block transmissions.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
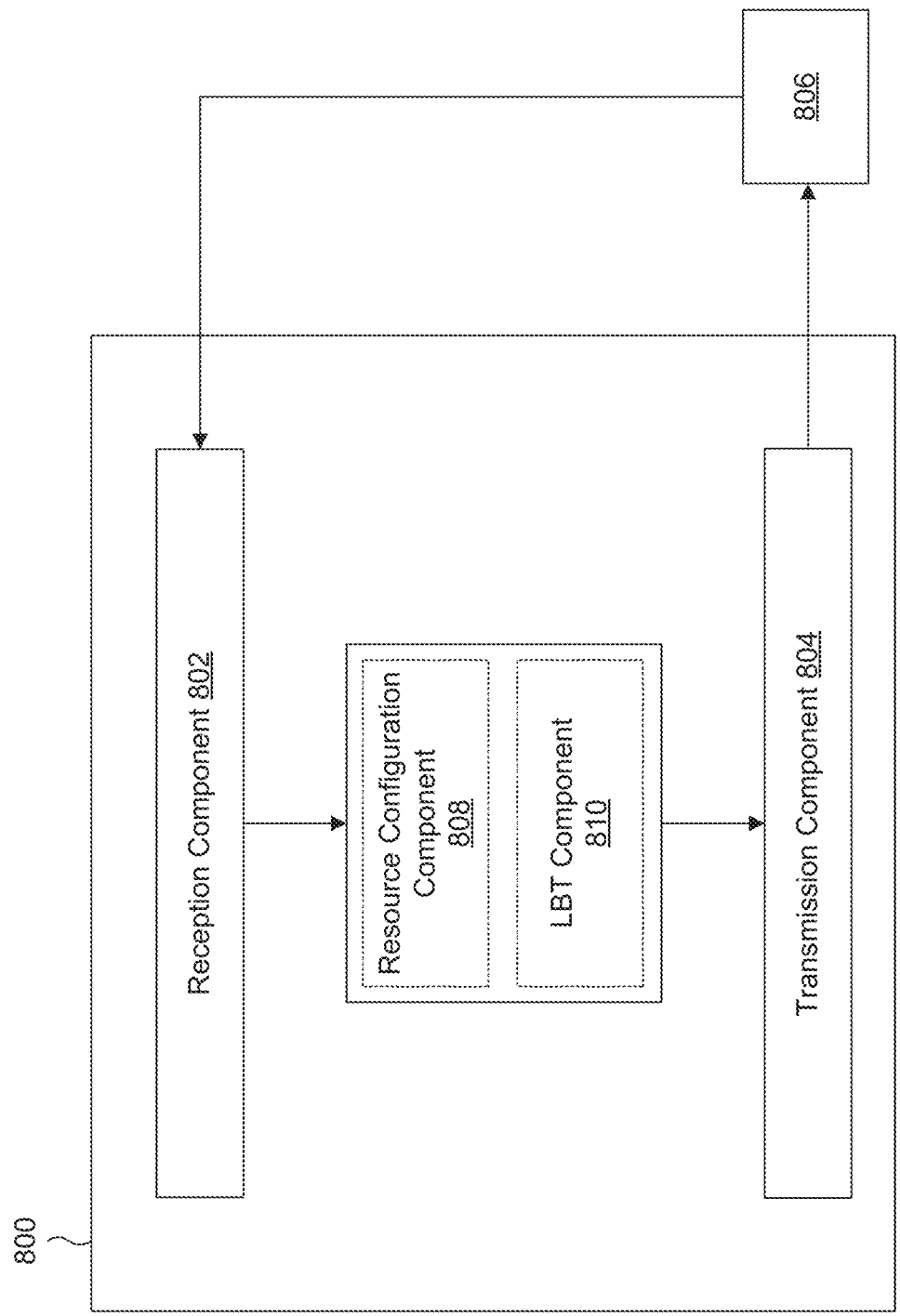
FIG. 8 is a block diagram of an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a resource configuration component 808 or an LBT component 810, among other examples.

In some aspects, the apparatus 800 may be configured to perform one or more operations described herein in connection with FIG. 5 and/or FIGS. 6A-6B. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The resource configuration component 808 may select, within a resource selection window, a set of resources in which to transmit over an unlicensed sidelink channel. The LBT component 810 may attempt an LBT procedure to initiate a COT in which to transmit over the unlicensed sidelink channel. The resource configuration component 808 may adjust, within at least a portion of the resource selection window, the set of resources in which to transmit over the unlicensed sidelink channel to be contiguous in at least a time domain based at least in part on the LBT procedure succeeding. The transmission component 804 may transmit, over the unlicensed sidelink channel, using the set of resources that are adjusted to be contiguous in at least the time domain.

The resource configuration component 808 may adjust, within the portion of the resource selection window, the set of resources in which to transmit over the unlicensed sidelink channel to occupy a minimum number of subchannels that are contiguous in a frequency domain.

The resource configuration component 808 may determine a duration between the trigger indicating that the LBT procedure succeeded and an earliest resource in the portion of the resource selection window. The resource configuration component 808 may move the earliest resource in the portion of the resource selection window to an earlier symbol or slot based at least in part on the duration satisfying a threshold.

The transmission component 804 may transmit, over the unlicensed sidelink channel, SCI that indicates non-shareable resources within the COT that are reserved for one or more initial transport block transmissions.

The resource configuration component 808 may adjust, within the portion of the resource selection window, the set of resources in which to transmit over the unlicensed sidelink channel to occupy different subchannels based at least in part on a frequency hopping pattern.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method for wireless communication performed by a UE, comprising: selecting, within a resource selection window, a set of resources in which to transmit over an unlicensed sidelink channel; attempting an LBT procedure to initiate a COT in which to transmit over the unlicensed sidelink channel; and adjusting, within at least a portion of the resource selection window, the set of resources in which to transmit over the unlicensed sidelink channel to be contiguous in at least a time domain based at least in part on the LBT procedure succeeding.

Aspect 2: The method of aspect 1, further comprising: adjusting, within the portion of the resource selection window, the set of resources in which to transmit over the unlicensed sidelink channel to occupy a minimum number of subchannels that are contiguous in a frequency domain.

Aspect 3: The method of any of aspects 1 through 2, wherein one or more resources that are later in the time domain are adjusted to be contiguous in one or more of the time domain or a frequency domain with an earliest resource within the portion of the resource selection window.

Aspect 4: The method of any of aspects 1 through 3, wherein the set of resources that are adjusted within the portion of the resource selection window are preselected for one or more initial transport block transmissions.

Aspect 5: The method of any of aspects 1 through 4, wherein the set of resources are adjusted at a MAC layer based at least in part on a trigger at a PHY layer indicating that the LBT procedure succeeded.

Aspect 6: The method of any of aspects 1 through 5, wherein adjusting the set of resources includes: determining a duration between a trigger indicating that the LBT procedure succeeded and an earliest resource in the portion of the resource selection window; and moving the earliest resource in the portion of the resource selection window to an earlier symbol or slot based at least in part on the duration satisfying a threshold.

Aspect 7: The method of any of aspects 1 through 6, further comprising: transmitting, over the unlicensed sidelink channel, SCI that indicates non-shareable resources within the COT that are reserved for one or more initial transport block transmissions.

Aspect 8: The method of aspect 7, wherein the SCI indicates the non-shareable resources based at least in part on a starting subchannel and an ending subchannel reserved for the one or more initial transport block transmissions.

Aspect 9: The method of any of aspects 7 through 8, wherein the SCI further indicates a maximum set of occupied subchannels, interlaces, or RB sets in the COT.

Aspect 10: The method of aspect 9, wherein shareable resources within the COT include all resources in the maximum set of occupied subchannels, interlaces, or RB sets, excluding the non-shareable resources.

Aspect 11: The method of any of aspects 1 or 3 through 10, further comprising: adjusting, within the portion of the resource selection window, the set of resources in which to transmit over the unlicensed sidelink channel to occupy different subchannels based at least in part on a frequency hopping pattern.

Aspect 12: The method of aspect 11, wherein the frequency hopping pattern is based at least in part on one or more identifiers associated with the UE, and wherein the SCI includes the one or more identifiers associated with the UE to indicate the non-shareable resources that are reserved for the one or more initial transport block transmissions.

Aspect 13: An apparatus for wireless communication at a first device, comprising a processor; memory coupled with the processor; and instructions stored in the memory and executable by the processor to cause the apparatus to perform a method of any of aspects 1 through 12.

Aspect 14: A UE for wireless communication, comprising a memory and one or more processors coupled to the memory, the memory and the one or more processors configured to perform a method of any of aspects 1 through 12.

Aspect 15: An apparatus for wireless communication, comprising at least one means for performing a method of any of aspects 1 through 12.

Aspect 16: A non-transitory computer-readable medium storing code for wireless communication, the code comprising instructions executable by a processor to perform a method of any of aspects 1 through 12.

Aspect 17: A non-transitory computer-readable medium storing one or more instructions for wireless communication, the one or more instructions comprising one or more instructions that, when executed by one or more processors of a UE, cause the one or more processors to perform a method of any of aspects 1 through 12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   selecting, within a resource selection window corresponding to a projected used channel occupancy time (COT) region, a plurality of resources in which to transmit over an unlicensed sidelink channel, wherein the plurality of resources includes a first resource associated with a first subchannel and a second resource associated with a second subchannel non-contiguous with the first subchannel;
   attempting a listen before talk (LBT) procedure to initiate a COT in which to transmit over the unlicensed sidelink channel;
   moving, based at least in part on the LBT procedure succeeding, the second resource to a time resource, contiguous with the first resource and associated with the first subchannel, such that the first resource and the second resource are contiguous in a time domain, wherein the second resource is moved at a medium access control layer based at least in part on a trigger at a physical layer indicating that the LBT procedure succeeded; and transmitting, over the unlicensed sidelink channel and based at least in part on moving the second resource, using the plurality of resources.

2. The method of claim 1, wherein the second resource is later in the time domain than the time resource.

3. The method of claim 1, wherein the second resource is preselected for one or more initial transport block transmissions.

4. The method of claim 1, wherein moving the second resource is further based at least in part on a duration, between the trigger indicating that the LBT procedure succeeded and the second resource, satisfying a threshold, wherein the second resource is an earliest resource in the resource selection window.

5. The method of claim 1, further comprising:
transmitting, over the unlicensed sidelink channel, sidelink control information (SCI) that indicates non-shareable resources within the COT that are reserved for one or more initial transport block transmissions.

6. The method of claim 5, wherein the SCI indicates the non-shareable resources based at least in part on a starting subchannel and an ending subchannel reserved for the one or more initial transport block transmissions.

7. The method of claim 5, wherein the SCI further indicates a maximum set of occupied subchannels, interlaces, or resource block sets in the COT.

8. The method of claim 7, wherein shareable resources within the COT include all resources in the maximum set of occupied subchannels, interlaces, or resource block sets, excluding the non-shareable resources.

9. The method of claim 5, wherein transmitting using the plurality of resources is further based at least in part on a frequency hopping pattern.

10. The method of claim 9, wherein the frequency hopping pattern is based at least in part on one or more identifiers associated with the UE, and wherein the SCI includes the one or more identifiers associated with the UE to indicate the non-shareable resources that are reserved for the one or more initial transport block transmissions.

11. The method of claim 1, wherein, when the second resource is moved to the time resource, a transmission gap after the first resource is closed.

12. A user equipment (UE) for wireless communication, comprising:
one or more memories; and
one or more processors coupled to the one or more memories, the one or more processors configured to:
select, within a resource selection window corresponding to a projected used channel occupancy time (COT) region, a plurality of resources in which to transmit over an unlicensed sidelink channel, wherein the plurality of resources includes a first resource associated with a first subchannel and a second resource associated with a second subchannel non-contiguous with the first subchannel;
attempt a listen before talk (LBT) procedure to initiate a COT in which to transmit over the unlicensed sidelink channel;
move, based at least in part on the LBT procedure succeeding, the second resource to a time resource, contiguous with the first resource and associated with the first subchannel, such that the first resource and the second resource are contiguous in a time domain, wherein the second resource is moved at a medium access control layer based at least in part on a trigger at a physical layer indicating that the LBT procedure succeeded; and
transmit, over the unlicensed sidelink channel and based at least in part on moving the second resource, using the plurality of resources.

13. The UE of claim 12, wherein the second resource is later in the time domain than the time resource.

14. The UE of claim 12, wherein the one or more processors, when moving the second resource, are configured to:
move the second resource based at least in part on the LBT procedure succeeding and further based at least in part on a duration, between a trigger indicating that the LBT procedure succeeded and the second resource, satisfying a threshold,
wherein the second resource is an earliest resource in the resource selection window.

15. The UE of claim 12, wherein the one or more processors are further configured to:
transmit, over the unlicensed sidelink channel, sidelink control information (SCI) that indicates non-shareable resources within the COT that are reserved for one or more initial transport block transmissions.

16. The UE of claim 15, wherein the one or more processors, to transmit using the plurality of resources, are further to:
transmit, over the unlicensed sidelink channel, the plurality of resources based at least in part on moving the second resource and further based at least in part on a frequency hopping pattern.

17. The UE of claim 12, wherein, when the second resource is moved to the time resource, a transmission gap after the first resource is closed.

18. The UE of claim 12, wherein the second resource is preselected for one or more initial transport block transmissions.

19. A non-transitory computer-readable medium storing a set of instructions for wireless communication, the set of instructions comprising:
one or more instructions that, when executed by one or more processors of a user equipment (UE), cause the UE to:
select, within a resource selection window corresponding to a projected used channel occupancy time (COT) region, a plurality of resources in which to transmit over an unlicensed sidelink channel, wherein the plurality of resources includes a first resource associated with a first subchannel and a second resource associated with a second subchannel non-contiguous with the first subchannel;
attempt a listen before talk (LBT) procedure to initiate a COT in which to transmit over the unlicensed sidelink channel;
move, based at least in part on the LBT procedure succeeding, the second resource to a time resource, contiguous with the first resource and associated with the first subchannel, such that the first resource and the second resource are contiguous in a time domain, wherein the second resource is moved at a medium access control layer based at least in part on a trigger at a physical layer indicating that the LBT procedure succeeded; and
transmit, over the unlicensed sidelink channel and based at least in part on moving the second resource, using the plurality of resources.

20. The non-transitory computer-readable medium of claim 19, wherein the second resource is later in the time domain than the time resource.

21. The non-transitory computer-readable medium of claim 19, wherein the one or more instructions, that cause the UE to move the second resource, cause the UE to:
move the second resource based at least in part on the LBT procedure and further based at least in part on a duration, between a trigger indicating that the LBT procedure succeeded and the second resource, satisfying a threshold,
wherein the second resource is an earliest resource in the resource selection window.

22. The non-transitory computer-readable medium of claim 19, wherein the one or more instructions further cause the UE to:
transmit, over the unlicensed sidelink channel, sidelink control information (SCI) that indicates non-shareable resources within the COT that are reserved for one or more initial transport block transmissions.

23. The non-transitory computer-readable medium of claim 22, wherein, to transmit using the plurality of resources, the one or more instructions cause the UE to:
transmit, over the unlicensed sidelink channel, the plurality of resources based at least in part on moving the second resource and further based at least in part on a frequency hopping pattern.

24. The non-transitory computer-readable medium of claim 19, wherein, when the second resource is moved to the time resource, a transmission gap after the first resource is closed.

25. An apparatus for wireless communication, comprising:
means for selecting, within a resource selection window corresponding to a projected used channel occupancy time (COT) region, a plurality of resources in which to transmit over an unlicensed sidelink channel, wherein the plurality of resources includes a first resource associated with a first subchannel and a second resource associated with a second subchannel non-contiguous with the first subchannel;
means for attempting a listen before talk (LBT) procedure to initiate a COT in which to transmit over the unlicensed sidelink channel;
means for moving, based at least in part on the LBT procedure succeeding, the second resource to a time resource, contiguous with the first resource and associated with the first subchannel, such that the first resource and the second resource are contiguous in a time domain, wherein the second resource is moved at a medium access control layer based at least in part on a trigger at a physical layer indicating that the LBT procedure succeeded; and
means for transmitting, over the unlicensed sidelink channel and based at least in part on moving the second resource, using the plurality of resources that are adjusted to be contiguous in at least the time domain.

26. The apparatus of claim 25, wherein the second resource is later in the time domain than the time resource.

27. The apparatus of claim 25, wherein the means for moving the second resource includes:
means for moving the second resource based at least in part on the LBT procedure succeeding and further based at least in part on a duration, between a trigger indicating that the LBT procedure succeeded and the second resource, satisfying a threshold, wherein the second resource is an earliest resource in the resource selection window.

28. The apparatus of claim 25, further comprising:
means for transmitting, over the unlicensed sidelink channel, sidelink control information (SCI) that indicates non-shareable resources within the COT that are reserved for one or more initial transport block transmissions.

29. The apparatus of claim 28, wherein the means for transmitting using the plurality of resources comprises:
means for transmitting, over the unlicensed sidelink channel, using the plurality of resources based at least in part on moving the second resource and further based at least in part on a frequency hopping pattern.

30. The apparatus of claim 25, wherein, when the second resource is moved to the time resource, a transmission gap after the first resource is closed.

* * * * *